(12) United States Patent
Werbach et al.

(10) Patent No.: US 8,671,778 B2
(45) Date of Patent: Mar. 18, 2014

(54) CORIOLIS FLOW METER WITH IMPROVED MODE SEPARATION

(75) Inventors: Christopher Werbach, Longmont, CO (US); Gregory Treat Lanham, Longmont, CO (US)

(73) Assignee: Micro Motion, Inc., Boulder, CO (US)

( * ) Notice: Subject to any disclaimer, the term of this patent is extended or adjusted under 35 U.S.C. 154(b) by 405 days.

(21) Appl. No.: 13/125,843

(22) PCT Filed: Nov. 19, 2008

(86) PCT No.: PCT/US2008/084063
§ 371 (c)(1),
(2), (4) Date: Apr. 25, 2011

(87) PCT Pub. No.: WO2010/059157
PCT Pub. Date: May 27, 2010

(65) Prior Publication Data
US 2011/0247433 A1   Oct. 13, 2011

(51) Int. Cl.
*G01F 1/84* (2006.01)
(52) U.S. Cl.
USPC .............................. 73/861.357; 73/861.355
(58) Field of Classification Search
None
See application file for complete search history.

(56) References Cited

U.S. PATENT DOCUMENTS

| | | | |
|---|---|---|---|
| 4,781,069 A | 11/1988 | Mitzner | |
| 5,115,683 A | 5/1992 | Pratt | |
| 5,731,527 A | 3/1998 | Van Cleve | |
| 5,979,246 A * | 11/1999 | Van Cleve et al. | 73/861.357 |
| 6,314,820 B1 | 11/2001 | Ollila | |
| 6,354,154 B1 | 3/2002 | Van Cleve et al. | |
| 6,450,042 B1 * | 9/2002 | Lanham et al. | 73/861.357 |
| 6,598,489 B1 | 7/2003 | Van Cleve et al. | |
| 7,275,449 B2 | 10/2007 | Hussain et al. | |
| 2002/0139199 A1 * | 10/2002 | Lanham et al. | 73/861.354 |

FOREIGN PATENT DOCUMENTS

| | | |
|---|---|---|
| EP | 1223412 A1 | 7/2002 |
| EP | 1995572 A1 | 11/2008 |
| JP | 04099918 A | 3/1992 |
| JP | 04291119 A | 10/1992 |
| JP | 2003503722 A | 1/2003 |
| JP | 2007248125 A | 9/2007 |
| RU | 2008130101 A | 1/2010 |
| WO | 0102815 A1 | 1/2001 |
| WO | 2007074014 A1 | 5/2007 |
| WO | 2008059015 A1 | 5/2008 |

* cited by examiner

*Primary Examiner* — Harshad R Patel
(74) *Attorney, Agent, or Firm* — The Ollila Law Group LLC (57) ABSTRACT

A flow meter (20) including one or more flow tubes (103) and a driver (104A, 104B) adapted to vibrate the one or more flow tubes (103) at a drive frequency is provided. The flow meter (20) comprises a gusset (260). The gusset (260) is coupled to and extends along the flow tube (103) such that a frequency separation between the drive frequency and at least a second vibration frequency is increased.

23 Claims, 9 Drawing Sheets

CORIOLIS FLOW METER WITH IMPROVED MODE SEPARATION

TECHNICAL FIELD

The present invention relates to a flow meter, and more particularly, to a method and apparatus for improving separation between two or more vibration frequencies in a vibrating flow meter.

BACKGROUND OF THE INVENTION

Flow meters are used to measure the mass flow rate, density, and other characteristics of flowing materials. The flowing material may comprise a liquid, gas, solids suspended in liquids or gas, or any combination thereof. Vibrating conduit sensors, such as Coriolis mass flow meters and vibrating densitometers typically operate by detecting motion of a vibrating conduit that contains a flowing material. Properties associated with the material in the conduit, such as mass flow, density and the like, can be determined by processing measurement signals received from motion transducers associated with the conduit. The vibration modes of the vibrating material-filled system generally are affected by the combined mass, stiffness, and damping characteristics of the containing conduit and the material contained therein.

A typical Coriolis mass flow meter includes one or more conduits that are connected inline in a pipeline or other transport system and convey material, e.g., fluids, slurries and the like, in the system. Each conduit may be viewed as having a set of natural vibration modes, including for example, simple bending, torsional, radial, lateral, and coupled modes. In a typical Coriolis mass flow measurement application, a conduit is excited in one or more vibration modes as a material flows through the conduit, and motion of the conduit is measured at points spaced along the conduit. Excitation is typically provided by an actuator, e.g., an electromechanical device, such as a voice coil-type driver, that perturbs the conduit in a periodic fashion. Mass flow rate may be determined by measuring time delay or phase differences between motions at the transducer locations. Density of the flow material can be determined from a frequency of a vibrational response of the flow meter. Two such transducers (or pick-off sensors) are typically employed in order to measure a vibrational response of the flow conduit or conduits and are typically located at positions upstream and downstream of the actuator. The two pick-off sensors are generally connected to electronic instrumentation by cabling, such as by two independent pairs of wires. The instrumentation receives signals from the two pick-off sensors and processes the signals in order to derive flow measurements.

In operation, the flow tubes are driven out of phase with respect to one another. The drive force is generated by an electro mechanical driver which generates out of phase vibrations of the flow tubes at their natural resonance frequency. For discussion purposes, the flow tubes may be said to be driven in a vertical plane by the driver. These vertical vibrations are relatively large since they are at the first out of phase bending mode of the flow tubes and they are driven at their resonance frequency.

The Coriolis deflections of the vibrating flow tubes with material flow also occur in the same vertical plane as the drive vibrations. The Coriolis deflections occur at the drive frequency but the tube deflections have the shape of a bending mode with a higher frequency. Therefore, the amplitude of the Coriolis deflections is considerably less than the amplitude of the flow tube drive frequency vibrations. Even though the amplitude of the Coriolis response is relatively small, it is the Coriolis response that generates the pick-off output signals that are processed by meter electronics to generate the desired mass flow rate and other information pertaining to the flowing material. Many Coriolis flow meters are capable of obtaining an output error of about 0.15% or less. However, in order to achieve this accuracy, noise and unwanted signals must be minimized.

In the operation of a Coriolis flow meter, the signals induced in the pick-offs comprise not only the desired small amplitude Coriolis response signals, but also comprise unwanted signals that are applied to the processing circuitry along with the desired Coriolis response signals. These unwanted signals impair the ability of the processing circuitry to generate accurate output signals.

The unwanted pick-off signals may be caused by ambient noise from the surrounding environment. Ambient noise may be due to near-by machinery and the like. It may also be caused by vibrations in the pipeline to which the Coriolis flow meter is connected. Ambient noise can be overcome by proper mounting of the flow meter to isolate it from the external vibrations. The noise from connected pipeline vibrations can be overcome by appropriate isolation of the flow meter from the pipeline.

Another source for unwanted signals is unwanted vibrations in the flow meter. These unwanted vibrations are more difficult to overcome and can be minimized, but generally cannot be eliminated, by improving the flow meter design.

Most vibrating flow meters have various mode shapes that result from driving the flow meter at its resonant frequency. A typical flow meter can have vibrational modes that are characterized by their shapes as follows:

In-phase bend (IPB)
In-phase lateral (IPL)
Out-of phase bend (Drive)
Out-of phase lateral (OPL)

The out of phase bend is generally the desired drive mode while the rest are typically unwanted modes. The above mentioned modes are inherent in most vibrating flow meters, including Coriolis flow meters. The frequency of these modes generally changes with the density of the flowing material. When a mode changes frequency, there is a potential for interaction between neighboring modes that may cause the flow meter to become unstable and produce incorrect output data. As mentioned above, the mode that is desired and used to generate the desired output information of the flow meter is the out of phase bend drive mode. It is this mode that generates the Coriolis forces. The resulting Coriolis response is detected by the pick-offs, which generate the signals that are used to provide the flow meter output information.

The in phase lateral and out of phase lateral vibrations can create a problem when processing the signals received by the pick-offs representing the Coriolis forces. The lateral mode vibrations are typically offset from the drive plane. The lateral mode vibrations are generally substantially perpendicular to the drive mode vibrations. The lateral plane is substantially transverse to the applied oscillation.

One method of minimizing the adverse effects of the two different lateral frequencies is to increase the separation between the drive mode frequency and the unwanted lateral frequencies. If these undesired lateral mode signals have excessive amplitude and/or are close to the frequency of the Coriolis response signal, the electronic processing circuitry may be unable to process the Coriolis signal to generate output information having the desired accuracy.

It may be appreciated from the above that it is a problem in the design and operation of Coriolis flow meters to minimize the adverse impact of signals generated by undesired modes of vibration so that the processing of the Coriolis response signal and the output accuracy of the output signal of the flow meter is not compromised.

There have been a number of prior art approaches that have attempted to increase the separation of the drive mode frequency and the lateral mode frequency. One such approach is provided in U.S. Pat. No. 6,314,820 assigned to the present applicant. The '820 patent incorporates lateral mode stabilizers that slide over the flow tube and include extensions that extend inward to stiffen the lateral portion of the flow tube to raise the lateral vibration frequency. The stabilizers are held using a balance bar.

Although the method disclosed in the '820 patent provides adequate results, it requires excessive number of parts in addition to the balance bar. In addition, although the lateral mode stabilizers may be implemented in a curved flow tube design, they are more applicable to straight tube designs.

Another prior art approach is disclosed in U.S. Pat. No. 5,115,683, which uses a brace attached to the flow tube near the driver on one end and attached to a base on the other end. The brace is flexible to allow motion of the flow tube due to the Coriolis reaction but limits the ability of the flow tube to displace laterally. Again, the '683 requires excessive number of parts that are subject to damage.

Another prior art approach is disclosed in U.S. Pat. No. 6,354,154, assigned to the present applicant, which uses a balance bar with side ribs that inhibit the undesired lateral vibrations to raise the frequency of the lateral vibrations. U.S. Pat. No. 6,598,489 uses a similar idea as the '154 patent but shapes the ribs to raise the resonant frequency of the drive mode versus the lateral mode. A limitation of both the '154 patent and the '489 patent is the requirement of a balance bar. Because balance bars are typically not implemented in dual flow tube flow meters, this approach has limited applicability.

Another prior art approach is disclosed in U.S. Pat. Nos. 7,275,449 and 4,781,069 both of which disclose the use of plates or braces that connect the two flow tubes together in a way that increases the lateral mode frequency in order to separate it from the drive mode. A problem with this approach is that because the plates connect two separate flow tubes together, the drive mode may also be adversely affected. This may be especially true for low flow rate applications.

Therefore, there exists a need in the art for a flow meter design capable of separating at least two modes of vibration. Furthermore, there exists a need to separate at least two modes of vibration without requiring excessive parts. The present invention solves this and other problems and an advance in the art is achieved.

Aspects

According to an aspect of the invention, a flow meter including one or more flow tubes and a driver adapted to vibrate the one or more flow tubes at a drive frequency, the flow tube comprises:

a gusset coupled to and extending along the flow tube such that a frequency separation between the drive frequency and at least a second vibration frequency is increased.

Preferably, the gusset extends along a portion of the flow tube.

Preferably, the gusset extends along substantially the entire flow tube.

Preferably, the gusset couples two or more portions of the flow tube together.

Preferably, the at least second vibration frequency comprises a lateral vibration mode.

Preferably, the gusset is coupled to the flow tube such that a portion of the flow tube is stiffened.

Preferably, the gusset is adapted to raise a frequency of a lateral vibration mode.

Preferably, the gusset is formed as an integral part of the flow tube.

According to another aspect of the invention, a flow meter including one or more flow tubes and a driver adapted to vibrate the one or more flow tubes at a drive frequency, the flow tube comprises:

a gusset coupled to and extending along the flow tube such that a portion of the flow tube is stiffened.

Preferably, the gusset extends along a portion of the flow tube.

Preferably, the gusset extends along substantially the entire flow tube.

Preferably, the gusset couples two or more portions of the flow tube together.

Preferably, the gusset is adapted to increase a frequency separation between two or more vibration modes.

Preferably, the gusset is adapted to increase a separation between a frequency of the drive vibration and a frequency of a lateral vibration.

Preferably, the gusset is adapted to raise a frequency of a lateral vibration.

Preferably, the gusset comprises an integral portion of the flow tube.

According to an aspect of the invention, a method for increasing a separation between two or more vibration frequencies of a vibrating flow meter including one or more flow tubes and a driver configured to vibrate the one or more flow tubes at a drive frequency in a drive plane, the method comprises the step of:

coupling a gusset to the flow tube, such that the separation between two or more vibration frequencies is increased.

Preferably, the step of coupling the gusset to the flow tube comprises extending the gusset along a portion of the flow tube.

Preferably, the step of coupling the gusset to the flow tube comprises extending the gusset along substantially the entire length of the flow tube.

Preferably, the step of coupling the gusset to the flow tube comprises coupling two or more portions of the flow tube together.

Preferably, the two or more vibration frequencies comprises the drive frequency and a lateral vibration frequency.

Preferably, the step of coupling the gusset to the flow tube comprises coupling the gusset to two or more portions of the flow tube such that the frequency of a lateral vibration mode is increased.

Preferably, the step of coupling the gusset to the flow tube comprises coupling the gusset to two or more portions of the flow tube such that a portion of the flow tube is stiffened.

DETAILED DESCRIPTION OF THE INVENTION

FIGS. 1-8 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
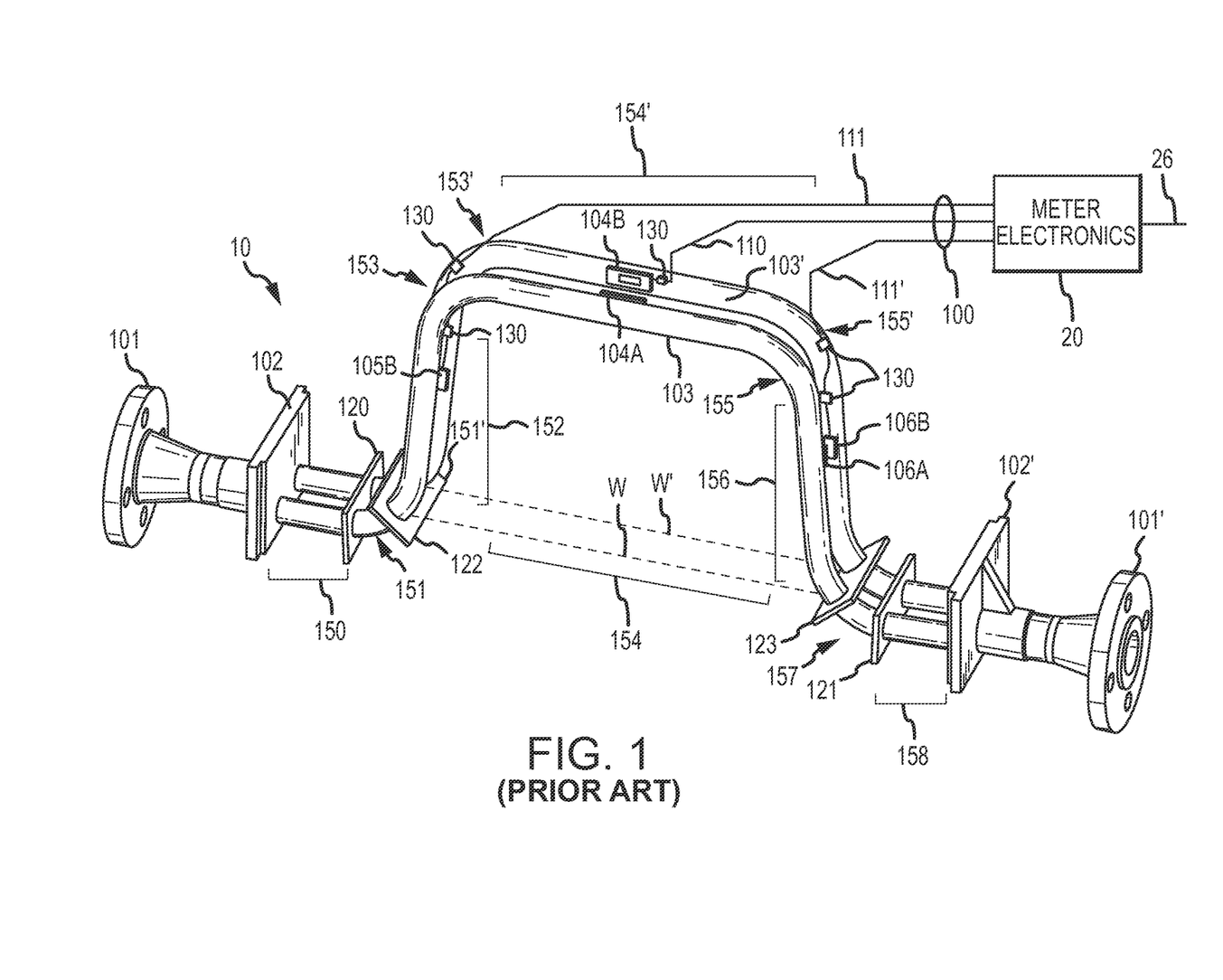
FIG. 1 shows a prior art flow meter.

FIG. 1 shows a flow meter 10 according to the prior art. The flow meter 10 may comprise a Coriolis flow meter, for example. The flow meter 10 comprises an inlet flange 101 and an outlet flange 101'. The flow meter 10 is adapted to be connected to a fluid pipeline or the like via inlet and outlet flanges 101, 101'. As fluid enters inlet flange 101, it is diverted into two separate streams by manifold 102. The fluid is separated and enters one of the flow tubes 103 or 103'. As the process fluid exits the flow tubes 103, 103', manifold 102' recombines the process fluid before it exits through the outlet manifold 101'. The flow meter 10 also includes a driver 104, which comprises a magnet 104A and a coil assembly 104B. Similarly, the flow meter 10 includes a first pick-off sensor 105 and a second pick-off sensor 106, which comprise a magnet 105A (not shown), 106A, and a coil assembly 105B, 106B.

The flow tubes 103, 103' can generally be separated into the following sections. However, it should be appreciated that the sections described are merely for the purpose of understanding as the flow tube 103, 103' is typically formed as a single continuous component. Furthermore, the sections relate to a U-shaped flow tube as shown in the figures. However, it should be understood that the present invention is equally applicable to straight flow tubes (See FIG. 8). In addition, although the flow meter has been shown as a dual flow tube flow meter, it should be understood that the invention is equally applicable to a single flow tube flow meter. Therefore, the present invention should not be limited to the embodiments shown in the figures, but rather those skilled in the art will recognize variations that fall within the scope of the claims.

A first bend 151, 151' connects a first straight portion 150, 150' to a second straight portion 152, 152'. A second bend 153, 153' connects the second straight portion 152, 152' to a third straight portion 154, 154'. A third bend 155, 155' connects the third straight portion 154, 154' to a fourth straight portion 156, 156'. A fourth bend 157, 157' connects the fourth straight portion 156, 156' to a fifth straight portion 158, 158'. It should be appreciated that other configurations are generally known in the art and therefore, the present invention should not be limited to requiring all of the portions discussed above. Furthermore, the invention may be implemented in flow tubes having more sections than listed above.

In operation, a drive signal is sent to the drive coil 104B via lead 110 by meter electronics 20. The drive signal causes the flow tubes 103, 103' to vibrate in a drive plane. The drive plane is defined by the flow tubes 103, 103' vibrating about bending axes W, W', respectively. The axes W, W' are partially defined using a plurality of brace bars 120-123, which limit the active area of the flow meter 10. The vibrating flow tubes 103, 103' induce voltages in the pick-off sensors 105, 106, which are sent to meter electronics 20 via leads 111 and 111'. Meter electronics 20 produces mass flow information, along with other information such as material density based on the signals sent by the pick-off sensors 105, 106. Temperature measurement devices such as RTDs (not shown) can also provide temperature measurements. Meter electronics 20 can send this information to a downstream process via lead 26.

The relatively unstable flow tubes 103, 103' of the prior art flow meter 10 suffers from noise created by lateral mode vibrations. The lateral mode vibrations are typically close to the drive mode vibrations and thus cause excessive interference in signals received from the pick-offs 105A, 105B and 106A, 106B.

Figure 2:
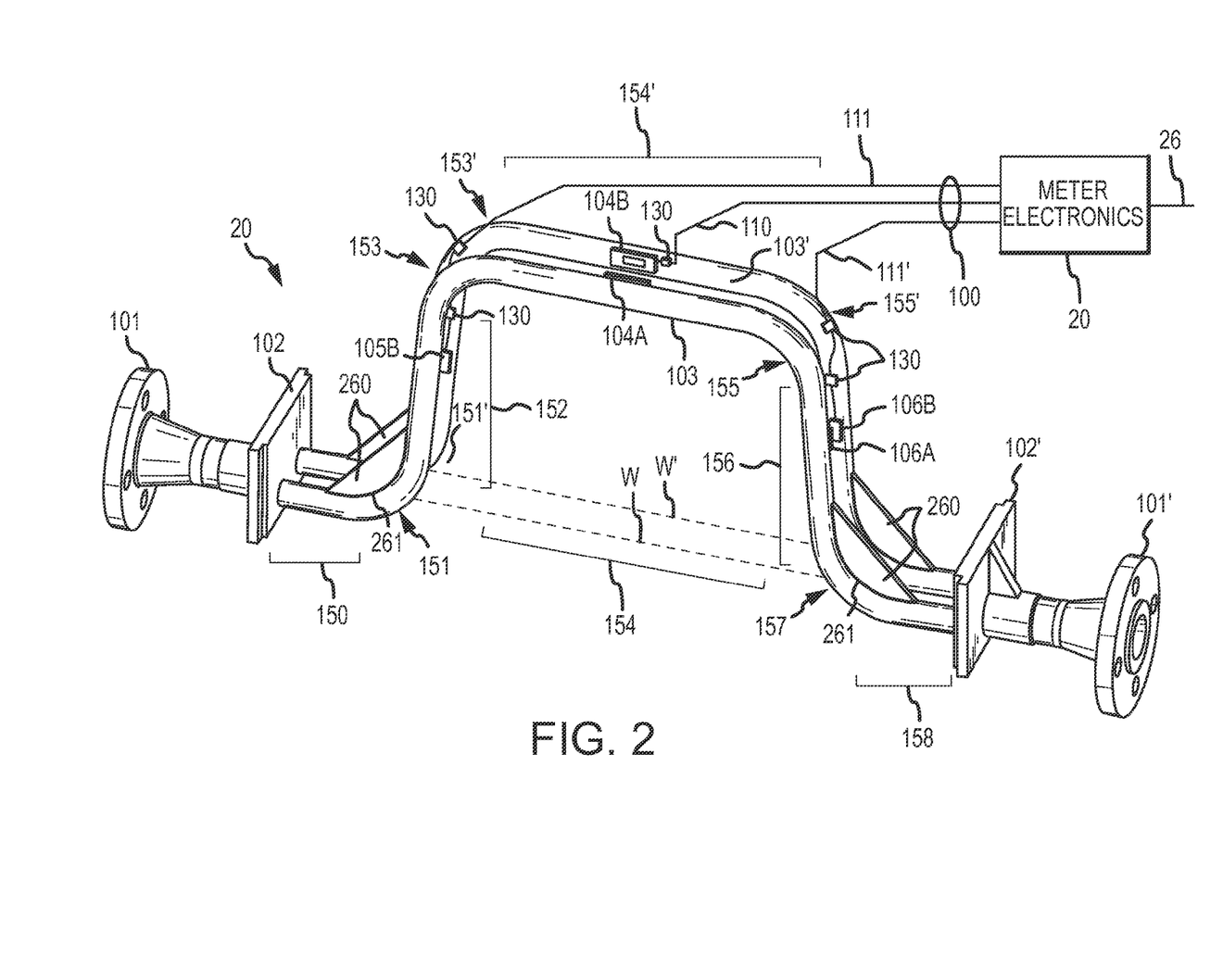
FIG. 2 shows a flow meter including gussets coupled to outer bends of the flow tubes according to an embodiment of the invention.

FIG. 2 shows a flow meter 20 according to an embodiment of the invention. Some of the components of the flow meter 20, for example the brace bars 120-123, have been omitted for simplicity. However, it should be understood that in most embodiments, those components are included. Although the flow meter 20 is shown as a Coriolis flow meter, it should be understood that the present invention can just as easily be implemented in other vibrating flow meters that lack the mass flow measurement capabilities of a Coriolis flow meter. Therefore, the present invention is not limited to Coriolis flow meters, but rather, may comprise other vibrating flow meters such as vibratory densitometers, for example.

In addition to the components included in the flow meter 10 of the prior art, the flow meter 20 according to an embodiment of the invention includes one or more gussets 260. The one or more gussets 260 can be coupled to the flow tubes 103, 103'. The one or more gussets 260 can extend along the flow tubes 103, 103'. The one or more gussets 260 may extend along a portion of the flow tubes 103, 103', or alternatively, the gussets 260 may extend along substantially the entire flow tube. The discussion that follows only discusses the gussets 260 being coupled to the first flow tube 103 for the purpose of clarity; however, it should be appreciated that in many embodiments both flow tubes 103 and 103' may include one or more gussets 260.

According to an embodiment of the invention, the flow meter 20 includes one or more gussets 260 coupled to and extending along the flow tube 103. The one or more gussets 260 may be coupled to and extend along a portion of the flow tube 103, for example. In the embodiment shown in FIG. 2, the gussets 260 are coupled to and extend along more than one portion of the flow tube 103. According to an embodiment of the invention, the one or more gussets 260 couple two or more straight portions of the flow tube together. According to an embodiment of the invention, the one or more gussets 260 are coupled to the flow tube 103 such that a portion of the flow tube 103 is stiffened. According to an embodiment of the invention, the one or more gussets 260 can be coupled to the flow tube 103 such that a frequency separation between two or more vibration modes is increased. According to an embodiment of the invention, the two or more vibration modes can comprise the drive mode and the lateral mode. However, it should be understood that the gussets 260 may be coupled to the flow tube 103 such that other vibration modes are separated. Therefore, the present invention should not be limited to separating the vibration frequency of the drive mode from the lateral mode. It should be appreciated that, unlike the prior art solutions, the gussets 260 of the present invention can be coupled to the flow tube 103 without being coupled to additional components of the flow meter 20. Therefore, the present invention can advantageously simplify the flow meter construction while separating the frequency between two or more vibration modes.

In some embodiments, the gussets 260 can separate the lateral mode frequency from the drive mode frequency by raising the lateral mode frequency. According to an embodiment of the invention, the lateral mode frequency of the flow tube 103 is raised by stiffening the flow tube 103 in the lateral direction using the gussets 260. This stiffness increases the lateral mode frequency without substantially affecting the drive mode frequency. By positioning the gussets 260 at the bends 151, 157 of the flow tube 103, the flow tube stiffness in the lateral plane is affected more than the stiffness in the drive plane.

Although the lateral mode stiffness of the flow tube 103 could be increased by increasing the thickness of the flow tube 103, such an increase would likely also increase the stiffness in the drive plane as well. Therefore, such an increase in the thickness of the flow tube 103 would not result in a substantial increase in the mode separation. Furthermore, this is undesirable as more energy is required to vibrate the flow tube to generate a measurement.

The gussets 260 may be coupled using methods generally known in the art including, but not limited to, brazing, welding, gluing, etc. Although the gussets 260 are shown as being brazed to the flow tubes 103 using brazing material 261, it should be understood that the particular method used for coupling the gussets 260 to the flow tube 103 is not important for the purposes of the present invention and therefore, should not limit the scope of the present invention. Furthermore, it should be understood that the gussets 260 may be formed as an integral part of the flow tubes 103, 103'. For example, it is known to form a flow meter from plastic using a molding technique as disclosed in U.S. Pat. Nos. 6,450,042 and 6,904,667, for example. Therefore, the gussets 260 may be formed while molding the flow tubes.

Preferably, the gussets 260 are formed from a substantially rigid material such that the gussets 260 provide a stiffening effect on the flow tube 103. Therefore, according to an embodiment of the invention, the gussets 260 are formed from a material having a stiffness at least as great as the flow tube material. It should be understood that the gussets 260 do not have to be formed from a material having a stiffness as great as the flow tube 103, however, gussets having a stiffness less than the flow tubes 103, 103' may not provide as much frequency separation between vibration modes. Therefore, it should be appreciated that the desired mode separation may be controlled, to some extent, based on the particular material chosen for the gussets 260. Furthermore, the vibration mode separation can be controlled by adjusting the size of the gussets 260.

According to an embodiment of the invention, the flow meter 260 includes a gusset 260 coupled to the first straight portion 150 and the second straight portion 152 of the flow tube 103. According to an embodiment of the invention, the gusset 260 couples the first straight portion 150 to the second straight portion 152. In addition, the embodiment shown in FIG. 2 includes a second gusset 260 that couples the fourth straight portion 156 to the fifth straight portion 158 of the flow tube 103. It should be appreciated that both of the gussets 260 shown in FIG. 2 provide the same function, namely to stiffen the flow tube 103 in the lateral direction without substantially inhibiting motion in the drive plane. Therefore, the gussets 260 can increase the lateral mode frequency without substantially adversely affecting the drive mode frequency. This substantially increases the separation between the lateral mode frequency and the drive mode frequency. It should be appreciated that the gussets 260 may affect the drive mode frequency; however, the lateral mode frequency is affected to a greater extent. In addition, the gussets 260 shown in FIG. 2 are shown as being coupled to the outer bends 151, 157. This may increase the stiffness of the flow tube 103 and thus, increase the frequency of the lateral mode vibration. However, as described below the gussets 260 may extend across the bends rather than being coupled to the bends.

Figure 3:
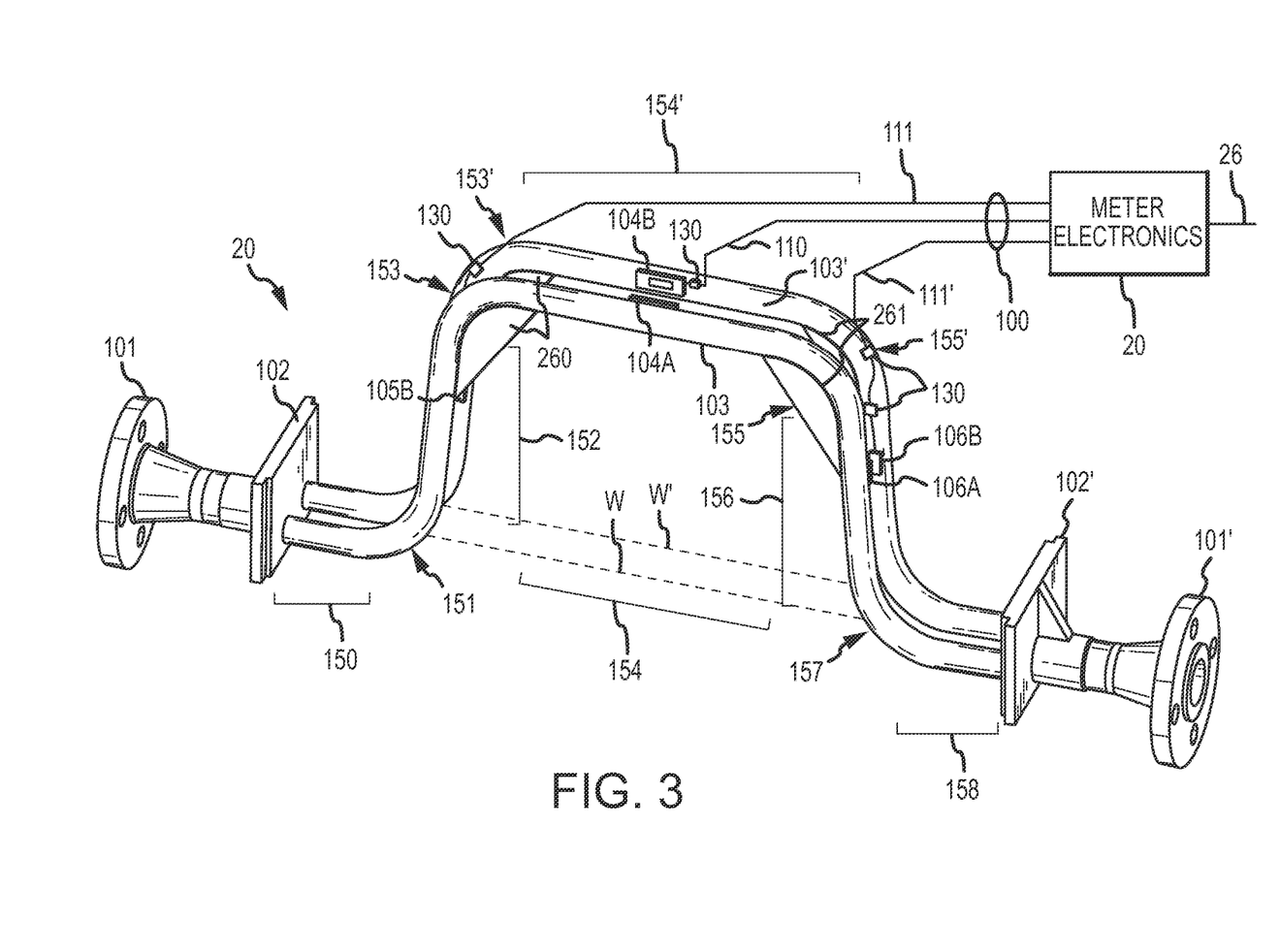
FIG. 3 shows a flow meter including gussets coupled to the inner bends of the flow tubes according to another embodiment of the invention.

FIG. 3 shows the flow meter 20 according to another embodiment of the invention. The embodiment shown in FIG. 3 includes gussets 260 similar to the gussets 260 shown in FIG. 2, with the exception of the placement of the gussets 260. The gussets 260 of FIG. 3 are coupled to the inner bends 153, 155 of the flow tube 103 rather than the outer bends 151, 157 as shown in FIG. 2. The gussets 260 shown in FIG. 2 are coupled to the second straight portion 152, the second bend 153, and the third straight portion 154 of the flow tube 103. In addition, a second gusset 260 is coupled to the third straight portion 154, the third bend 155, and the fourth straight section 155 of the flow tube 103. Therefore, the first gusset 260 shown in FIG. 3 couples the second straight portion 152 to the third straight portion 154 while the second gusset 260 couples the third straight portion 154 to the fourth straight portion 156. Because the gussets 260 shown in FIG. 3 extend across a bend 153, 155, the gussets 160 are able to substantially increase the lateral mode frequency to separate it from the drive mode frequency.

Figure 4:
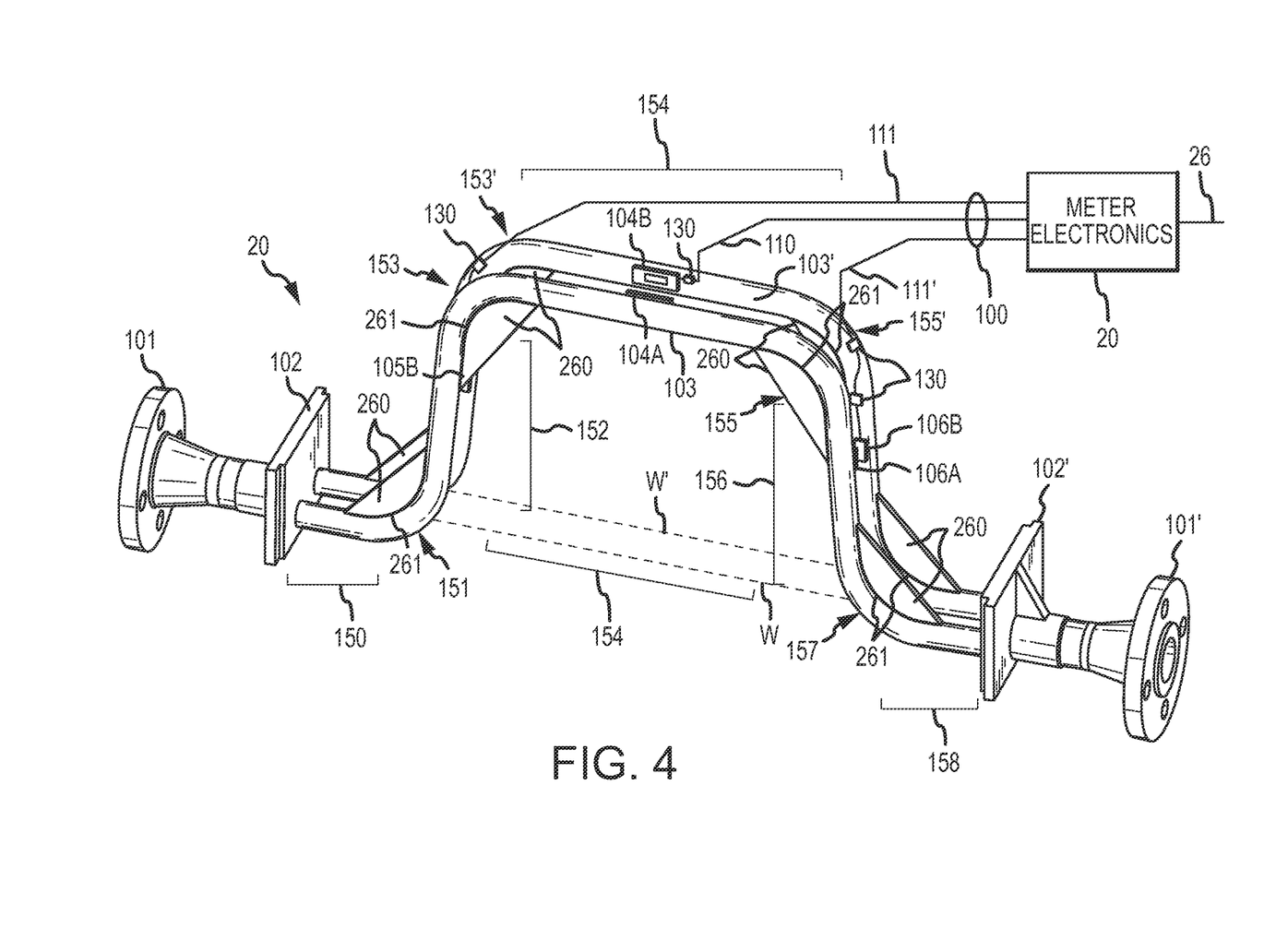
FIG. 4 shows a flow meter including gussets coupled to the inner and outer bends of the flow tubes according to another embodiment of the invention.

FIG. 4 shows the flow meter 20 according to another embodiment of the invention. According to the embodiment shown in FIG. 4, the flow meter 20 includes gussets 260 coupled across each of the bends 151, 153, 155, 157 in the flow tube 103. Providing gussets 260 at each of the bends 151, 153, 155, 157 can maximize the stiffness in the lateral direction thereby increasing the lateral mode frequency by more than the embodiments shown in FIGS. 2 or 3. Therefore, the embodiment shown in FIG. 4 can provide greater separation between the lateral mode frequency and the drive mode frequency than the previously described embodiments.

Figure 5:
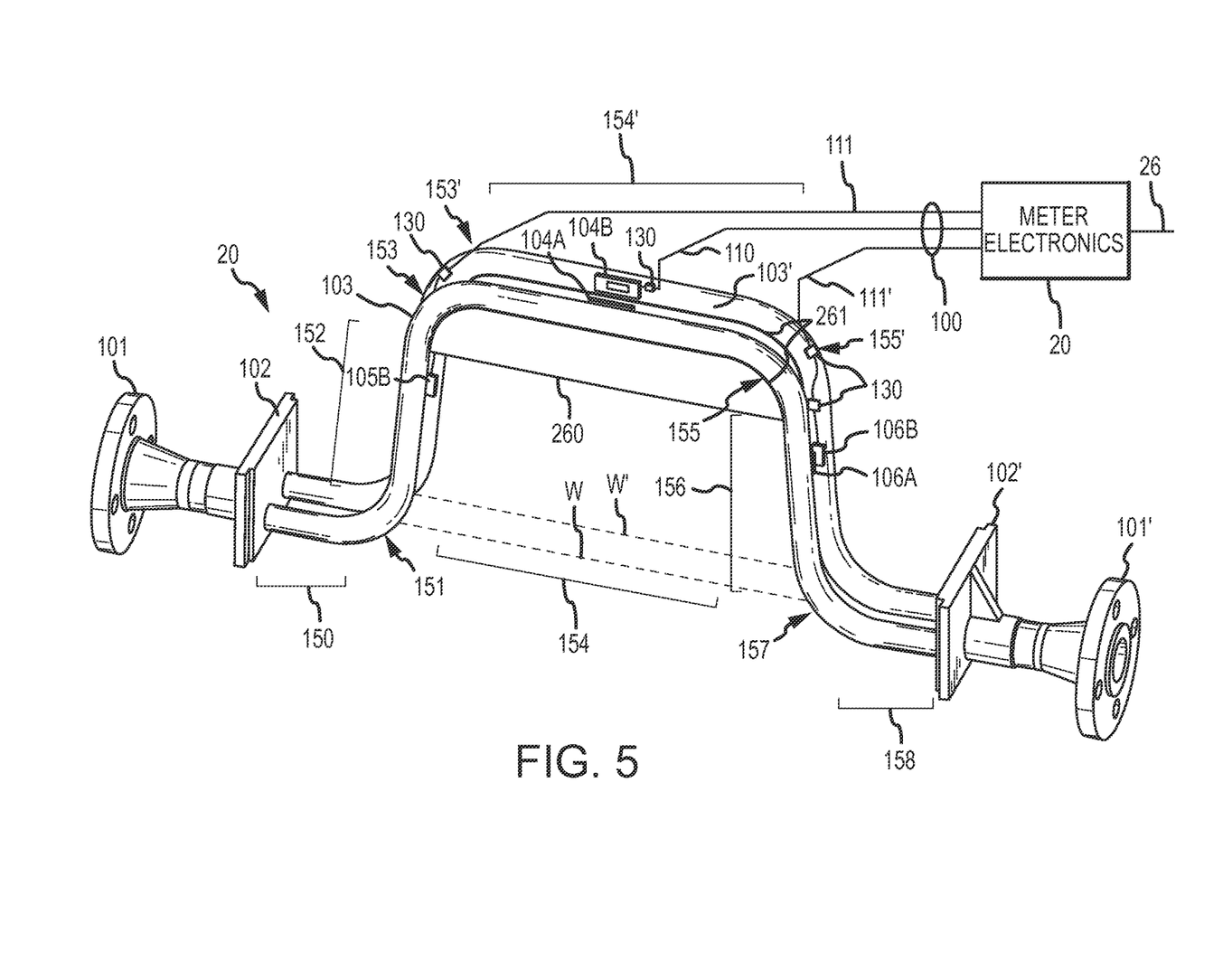
FIG. 5 shows a flow meter including a single gusset coupling three straight portions of the flow tubes according to another embodiment of the invention.

FIG. 5 shows the flow meter 20 according to another embodiment of the invention. The flow meter 20 in FIG. 5 provides a single gusset 260 that extends substantially completely across the third portion 154 of the flow tube 103 thereby coupling the second portion 152 with the fourth portion 156. The gusset 260 shown in FIG. 5 substantially eliminates the need for two gussets as shown in the previous embodiments.

Figure 6:
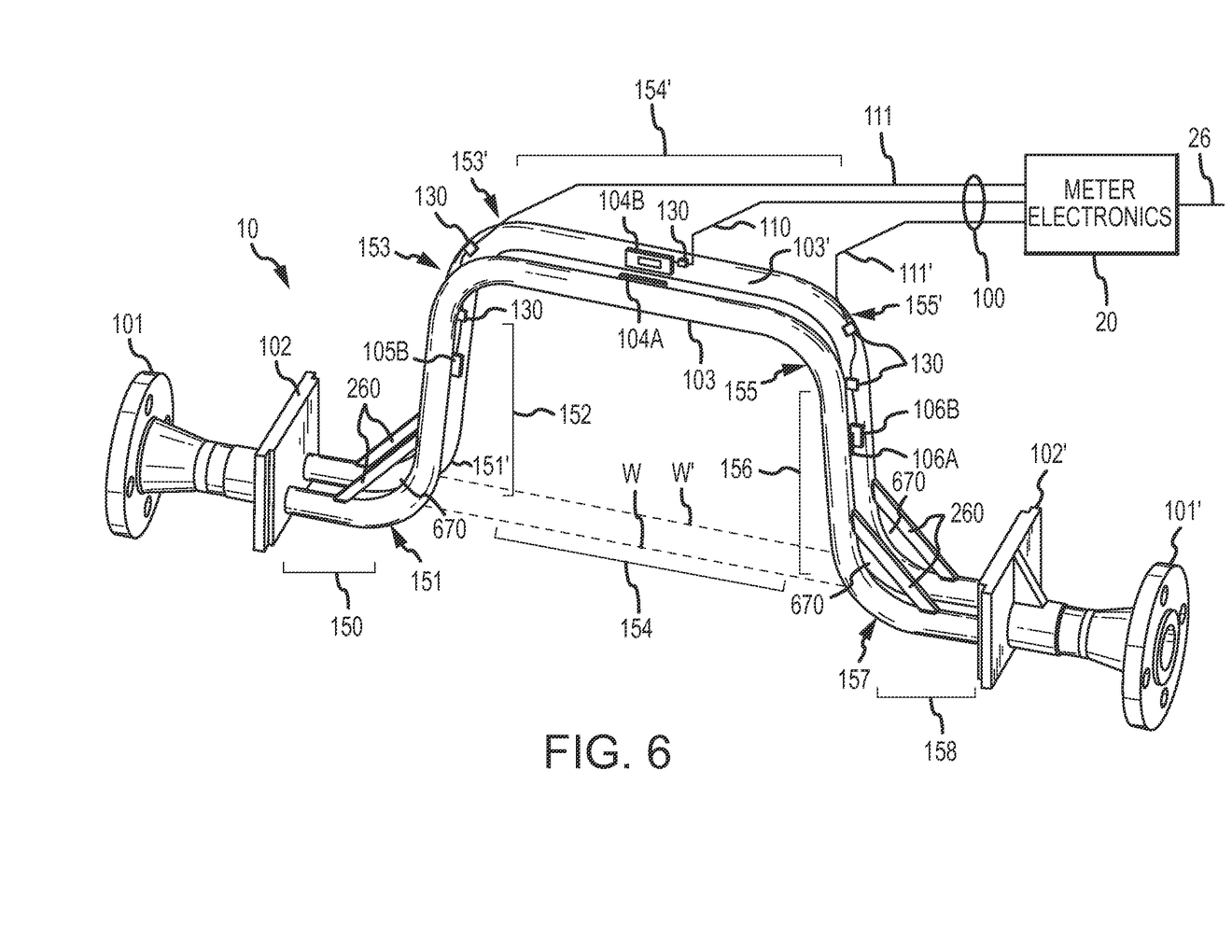
FIG. 6 shows a flow meter including gussets coupled across the outer bends of the flow tubes according to another embodiment of the invention.

FIG. 6 shows the flow meter 20 according to another embodiment of the invention. According to the embodiment shown in FIG. 6, the gussets 260 couple two portions of the flow tube 103, 103' together without coupling the bend sections 151, 157. Therefore, only the ends of the gusset 260 are coupled to the flow tube 103. This configuration leaves a gap 670 near the bends 151, 157. However, because the two straight portions of the flow tube 103 are coupled together, the flow tube 103 is stiffened in the lateral plane. Therefore, the lateral mode frequency is substantially increased without substantially affecting the drive mode frequency. The two vibration modes are substantially separated such that the noise caused by the lateral mode frequency is reduced. Although the gussets 260 extending across the bends are only shown as extending across the outer bends 151, 157, it should be understood that a similar configuration can be utilized on gussets extending across the inner bends 153, 155.

Figure 7:
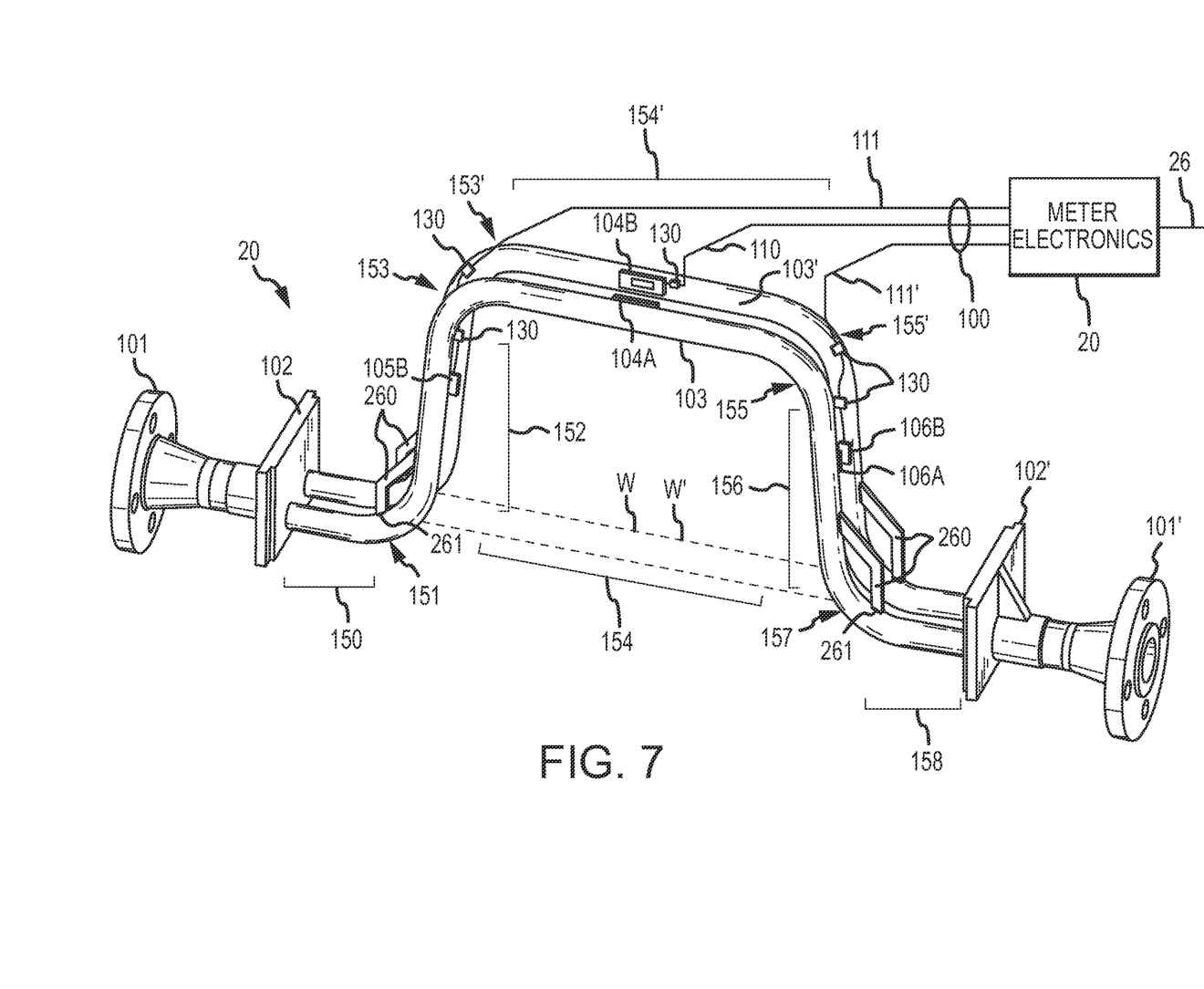
FIG. 7 shows a flow meter including gussets coupled to a straight portion and a bend portion of the flow tubes according to an embodiment of the invention.

FIG. 7 shows the flow meter 20 according to another embodiment of the invention. According to the embodiment shown in FIG. 7, the gussets 260 are coupled to only a single straight portion and a portion of a bend portion. For example, a first gusset 260 is shown coupled to the first bend 151 and the second straight portion 152. However, the first gusset 260 shown is not coupled to the first straight portion 150. Similarly, a second gusset 260 is shown as being coupled to the fourth straight portion 156 and the fourth bend section 157. However, the second gusset 260 is not coupled to the fifth straight portion 158. In certain embodiments, these gussets having reduced size may provide an adequate increase in stiffness such that the frequencies between two vibration modes are adequately separated. Therefore, it should be understood that while the gussets 260 are still coupled to two portions of the flow tube, the two portions may not need to be two straight portions to provide adequate frequency separation.

Figure 8:
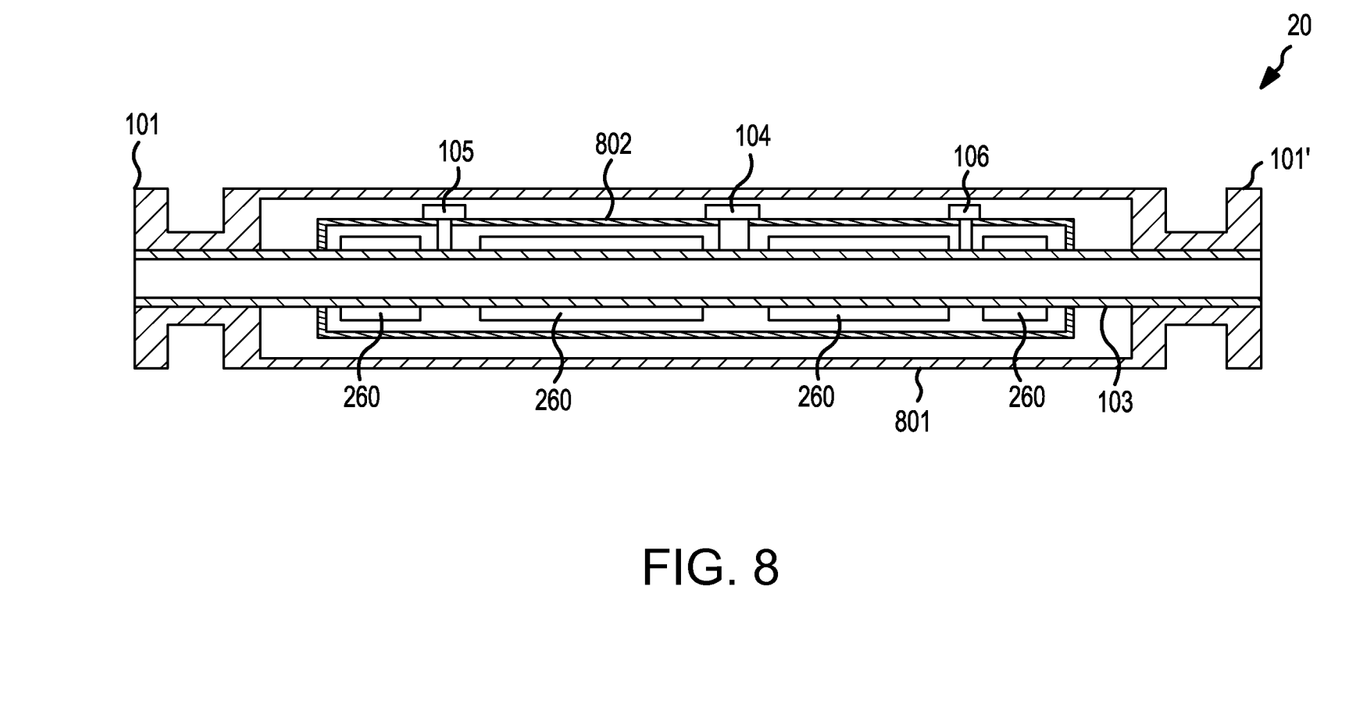
FIG. 8 shows a straight tube flow meter including gussets coupled to the flow tube according to an embodiment of the invention.

FIG. 8 shows a flow meter 20 according to another embodiment of the invention. In the embodiment shown in FIG. 8, the flow meter 20 comprises a straight flow tube configuration. The flow meter 20, as shown in FIG. 8, includes a straight flow tube 103, a flow meter case 801, a balance bar 802, and gussets 260. According to the embodiment shown, the driver 104 can be coupled to the flow tube 103 and the balance bar 802. The pick-off sensors 105, 106 can detect the resulting vibrations as discussed above. Although not shown, it should be appreciated that the driver 104 and pick-off sensors 105, 106 can be coupled to meter electronics, as discussed above.

According to the embodiment shown in FIG. 8, the gussets 260 can be coupled to the flow tube 103 and extend along the flow tube 103. In the embodiment shown, the flow meter 20 comprises four separate gussets 260, each of which extends along a portion of the flow tube 103. The gussets 260 can be sized and positioned to increase a frequency separation between two or more vibration modes, as discussed above. In some embodiments, the vibration sensors, including the driver 104 and pick-off sensors 105, 106 may be coupled to the gussets 260 rather than directly to the flow tube 103.

Figure 9:
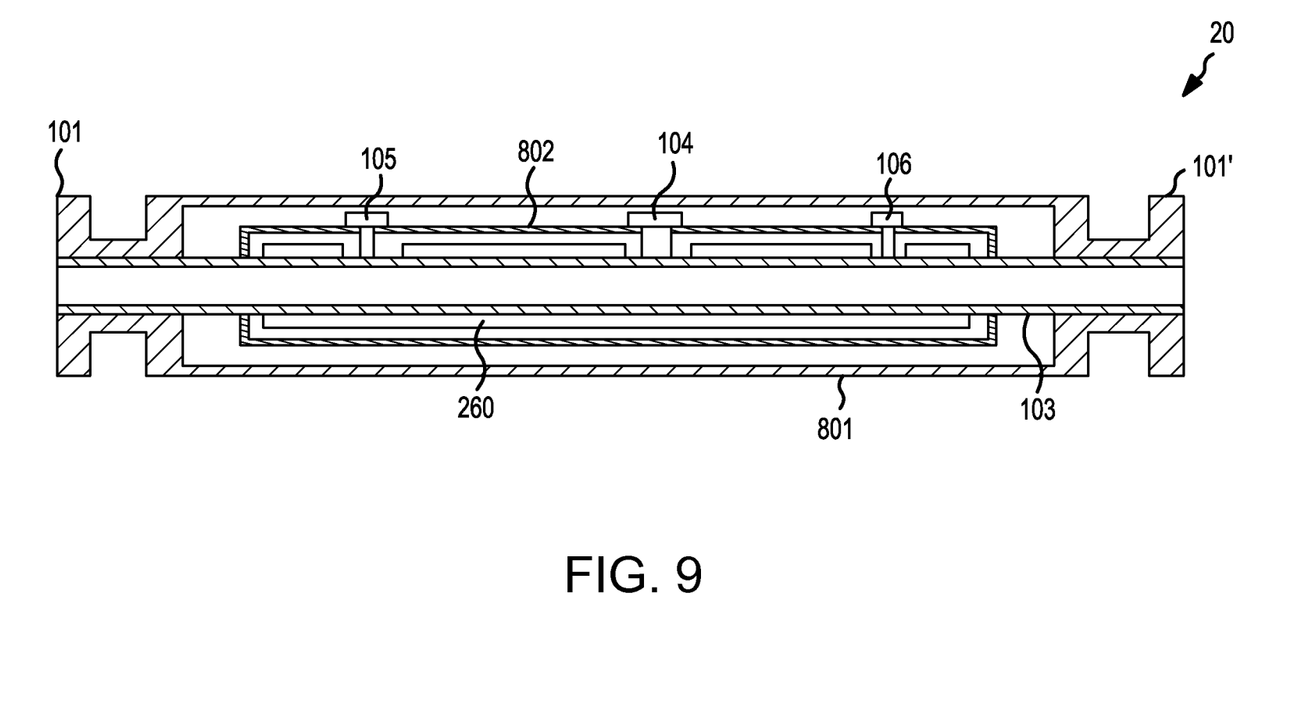
FIG. 9 shows a straight tube flow meter including gussets coupled to the flow tube according to an embodiment of the invention.

FIG. 9 shows a flow meter 20 according to another embodiment of the invention. The embodiment of FIG. 9 differs from FIG. 8 in that it includes a single gusset 260 that extends along substantially the entire flow tube 103.

The present invention as described above provides a flow meter with increased mode separation. In some embodiments, the two modes separated comprise the drive mode and the lateral mode. According to this embodiment, the lateral mode frequency is increased relative to the drive mode frequency by providing one or more gussets 260. The one or more gussets 260 stiffen the flow tube 103 in the lateral plane, thereby increasing the lateral mode frequency.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention. Thus, although specific embodiments of, and examples for, the invention are described herein for illustrative purposes, various equivalent modifications are possible within the scope of the invention, as those skilled in the relevant art will recognize. The teachings provided herein can be applied to other flow meters, and not just to the embodiments described above and shown in the accompanying figures. Accordingly, the scope of the invention should be determined from the following claims.

We claim:

1. A flow meter (20) including one or more flow tubes (103) and a driver (104A, 104B) adapted to vibrate the flow tube (103) at a drive frequency, the one or more flow tubes (103) comprising:
   a gusset (260) coupled to and extending along the flow tube (103) such that a frequency separation between the drive frequency and at least a second vibration frequency is increased.

2. The flow meter (20) of claim 1, wherein the gusset (260) extends along a portion of the flow tube (103).

3. The flow meter (20) of claim 1, wherein the gusset (260) extends along substantially the entire flow tube (103).

4. The flow meter (20) of claim 1, wherein the gusset (260) couples two or more portions of the flow tube (103) together.

5. The flow meter (20) of claim 1, wherein the at least second vibration frequency comprises a lateral vibration mode.

6. The flow meter (20) of claim 1, wherein the gusset (260) is coupled to the flow tube (103) such that a portion of the flow tube (103) is stiffened.

7. The flow meter (20) of claim 1, wherein the gusset (260) is adapted to raise a frequency of a lateral vibration mode.

8. The flow meter (20) of claim 1, wherein the gusset (260) is formed as an integral part of the flow tube (103).

9. A flow meter (20) including one or more flow tubes (103) and a driver (104A, 104B) adapted to vibrate the flow tube (103) at a drive frequency, the one or more flow tubes (103) comprising:
   a gusset (260) coupled to and extending along the flow tube (103) such that a portion of the flow tube (103) is stiffened.

10. The flow meter (20) of claim 9, wherein the gusset (260) extends along a portion of the flow tube (103).

11. The flow meter (20) of claim 9, wherein the gusset (260) extends along substantially the entire flow tube (103).

12. The flow meter (20) of claim 9, wherein the gusset (260) couples two or more portions of the flow tube (103) together.

13. The flow meter (20) of claim 9, wherein the gusset (260) is adapted to increase a frequency separation between two or more vibration modes.

14. The flow meter (20) of claim 9, wherein the gusset (260) is adapted to increase a separation between a frequency of the drive vibration and a frequency of a lateral vibration.

15. The flow meter (20) of claim 9, wherein the gusset (260) is adapted to raise a frequency of a lateral vibration.

16. The flow meter (20) of claim 9, wherein the gusset (260) comprises an integral portion of the flow tube (103).

17. A method for increasing a separation between two or more vibration frequencies of a vibrating flow meter including one or more flow tubes and a driver configured to vibrate the one or more flow tubes at a drive frequency in a drive plane, the method comprising the step of:
   coupling a gusset to the flow tube, such that the separation between two or more vibration frequencies is increased.

18. The method of claim 17, wherein the step of coupling the gusset to the flow tube comprises extending the gusset along a portion of the flow tube.

19. The method of claim 17, wherein the step of coupling the gusset to the flow tube comprises extending the gusset along substantially the entire length of the flow tube.

20. The method of claim 17, wherein the step of coupling the gusset to the flow tube comprises coupling two or more portions of the flow tube together.

21. The method of claim 17, wherein the two or more vibration frequencies comprises the drive frequency and a lateral vibration frequency.

22. The method of claim 17, wherein the step of coupling the gusset to the flow tube comprises coupling the gusset to two or more portions of the flow tube such that the frequency of a lateral vibration mode is increased.

23. The method of claim 17, wherein the step of coupling the gusset to the flow tube comprises coupling the gusset to two or more portions of the flow tube such that a portion of the flow tube is stiffened.

\* \* \* \* \*